US012543122B2

(12) United States Patent
He et al.

(10) Patent No.: US 12,543,122 B2
(45) Date of Patent: Feb. 3, 2026

(54) EXPLICIT POWER SAVING OPERATIONS FOR A NETWORK-CONTROLLED REPEATER (NCR) IN WIRELESS COMMUNICATIONS

(71) Applicant: Apple Inc., Cupertino, CA (US)

(72) Inventors: Hong He, San Jose, CA (US); Dawei Zhang, Saratoga, CA (US); Seyed Ali Akbar Fakoorian, San Diego, CA (US); Jie Cui, San Jose, CA (US); Wei Zeng, Saratoga, CA (US); Ankit Bhamri, Bad Nauheim (DE); Haitong Sun, Cupertino, CA (US); Chunhai Yao, Beijing (CN); Chunxuan Ye, San Diego, CA (US); Huaning Niu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 355 days.

(21) Appl. No.: 18/202,749

(22) Filed: May 26, 2023

(65) Prior Publication Data
US 2024/0040510 A1  Feb. 1, 2024

Related U.S. Application Data

(60) Provisional application No. 63/393,779, filed on Jul. 29, 2022.

(51) Int. Cl.
*H04W 52/02* (2009.01)
*H04W 72/232* (2023.01)
(52) U.S. Cl.
CPC ....... *H04W 52/028* (2013.01); *H04W 72/232* (2023.01)

(58) Field of Classification Search
CPC .......................... H04W 52/028; H04W 72/232
See application file for complete search history.

(56) References Cited

U.S. PATENT DOCUMENTS

| 2013/0215812 | A1* | 8/2013 | Hu | H04W 52/0241 370/312 |
|---|---|---|---|---|
| 2020/0336928 | A1* | 10/2020 | Seo | H04L 5/0048 |
| 2024/0022315 | A1* | 1/2024 | Kusashima | H04W 16/26 |

OTHER PUBLICATIONS

3GPP TS 38.212 V17.1.0 (Mar. 2022), 3rd Generation Partnership Project; Technical Specification Group Radio Access Network; NR; Multiplexing and channel coding (Release 17); 208 pages.
(Continued)

*Primary Examiner* — Kiet Tang
(74) *Attorney, Agent, or Firm* — Sterne, Kessler, Goldstein & Fox P.L.L.C.

(57) ABSTRACT

Some embodiments include a system, apparatus, article of manufacture, method, and/or computer program product and/or combinations and sub-combinations thereof, for explicit power saving operations for a network-controlled repeater (NCR) in a wireless network. Some embodiments include an NCR that can receive a Downlink Control Information (DCI) format comprising an offset indication in a single Physical Downlink Control Channel (PDCCH) monitoring periodicity, $K_S$, where $K_S$ is an integer of slots. The NCR can determine a single On-Off Pattern (OOP) within KS based at least on the offset indication, and communicate with a base station or a user equipment (UE) based at least on the determination. In some embodiments, an Off-State of the NCR is a default, and the offset indication identifies a duration of an On-State of the NCR beginning at a starting orthogonal frequency division multiplexing (OFDM) symbol of $K_S$.

15 Claims, 9 Drawing Sheets

(56) References Cited

OTHER PUBLICATIONS

3GPP TS 38.213 V17.2.0 (Jun. 2022), 3rd Generation Partnership Project; Technical Specification Group Radio Access Network; NR; Physical layer procedures for control (Release 17); 256 pages.
3GPP TS 38.331 V17.0.0 (Mar. 2022), 3rd Generation Partnership Project; Technical Specification Group Radio Access Network; NR; Radio Resource Control (RRC) protocol specification (Release 17); 1221 pages.
3GPP TR 38.867 V0.1.0 (May 2022), 3rd Generation Partnership Project; Technical Specification Group Radio Access network; Study on NR network-controlled repeaters; (Release 18); 12 pages.
ZTE Corporation, "New SI: Study on NR Smart Repeaters," 3GPP TSG RAN Meeting #94e, Electronic Meeting, Dec. 6-17, 2021, RP-213592; 4 pages.

\* cited by examiner

EXPLICIT POWER SAVING OPERATIONS FOR A NETWORK-CONTROLLED REPEATER (NCR) IN WIRELESS COMMUNICATIONS

CROSS-REFERENCE TO RELATED APPLICATIONS

This application claims benefit of U.S. Provisional Application No. 63/393,779, filed on Jul. 29, 2022, entitled, Explicit Power Saving Operations for a Network-Controlled Repeater (NCR) in Wireless Communications, which is incorporated herein by reference in its entirety.

BACKGROUND

Field

The described embodiments relate generally to power saving operations for a network-controlled repeater (NCR) in a wireless communications system.

Related Art

Wireless communications systems support performance of an amplify-and-forward radio frequency (RF) repeater in a wireless communications system between a base station (BS) and a communications device such as a user equipment (UE). NR Network-controlled Repeaters are described in the 3rd Generation Partnership Project (3GPP) TR 38.867.

SUMMARY

Some embodiments include a system, apparatus, article of manufacture, method, and/or computer program product and/or combinations and sub-combinations thereof, for explicit power saving operations for a network-controlled repeater (NCR) in a wireless network. Some embodiments include an NCR that can receive a Downlink Control Information (DCI) format including an offset indication field in a single Physical Downlink Control Channel (PDCCH) monitoring periodicity, $K_S$, where $K_S$ includes an integer number of slots. The NCR can determine a single On-Off Pattern (OOP) within $K_S$ based at least on a value of the offset indication field, and communicate with a base station or a user equipment (UE) based at least on the determination of the single OOP.

In some embodiments, an Off-state of the NCR is a default, and the value of the offset indication field identifies a duration of an On-state of the single OOP of the NCR beginning at a starting orthogonal frequency division multiplexing (OFDM) symbol of $K_S$ slots. The offset indication field can include M bits, where $M=\text{ceiling}(\log_2(K_S*14))$, and the value of the offset indication field ranges from 1 OFDM symbol to $K_S*14$ OFDM symbols with a granularity of one symbol. In some embodiments, the NCR can be provisioned with a set of candidate values of the offset indication field that includes a set of OFDM symbols or a set of slots configured via Radio Resource Control (RRC) signaling, the value of the offset indication field can be a one-to-one mapping to a candidate value of the set of candidate values. The NCR can receive via RRC signaling, an offset granularity, G, where the offset indication field includes N bits, where $N=\text{ceiling}(\log_2(K_S/G))$, and the value of the offset indication field can be a one-to-one mapping to a candidate offset value in units of the offset granularity, G.

In some embodiments, the offset indication field includes Q bits, where $Q=(Q_1+Q_2)$ bits, where $Q_1$ is a first subset of bits and $Q_2$ is a second subset of bits, and $Q_1=\text{ceiling}(\log_2(N_{symbol,max}))$ bits that indicate a number of slots, $N_{slot}$, relative to a starting slot of $K_S$ with values ranging from 1 to $N_{slot,max}$, $Q_2=\text{ceiling}(\log_2(N_{symbol,max}))$ bits that indicate a number of OFDM symbols, $N_{symbol}$, in a slot index $N_{slot}+1$ with values ranging from 1 to $N_{symbol,max}$, where the starting slot of $K_S$ is indexed at $N_{slot}=0$, where the offset indication field comprises the first and the second subsets.

In some embodiments, the On-state of the NCR is a default, and the value of the offset indication field indicates a gap between a starting OFDM symbol of $K_S$, and a starting symbol of an Off-state of the single OOP (e.g., within the periodicity) of the NCR.

In some embodiments the NCR can perform a method for receiving a DCI format that includes one or more duration fields in a single PDCCH monitoring periodicity, $K_S$, where $K_S$ includes an integer of slots. The NCR can determine multiple On-Off patterns (OOPS) within $K_S$ based at least on one or more values of the one or more duration fields, and communicate with a base station or a UE based at least on the determination. When an Off-state of the NCR is a default, the one or more duration fields correspond to On-states of the multiple OOPS beginning at a starting OFDM symbol of $K_S$. When a first OOP of the multiple OOPS includes a first duration of the one or more durations and a first offset value, the first offset value indicated in an offset field (e.g., a separate offset field) in the DCI format represents a gap between an end of the first duration field and the start of a second duration field of the one or more duration fields. The last OOP of the multiple OOPS includes a last duration field of the one or more duration fields. When the NCR operates in a frequency division duplex (FDD) system, the DCI format further includes a 2-bit field that indicates whether the multiple OOPS are applied in an uplink (UL) direction, a downlink (DL) direction, or both UL and DL directions.

When an On-state of the NCR is a default, a first OOP of the multiple OOPS corresponds to a first duration field of the one or more duration fields and a first offset value of a plurality of offset values, where the first offset value is indicated in an offset field (e.g., a separate offset field) in the DCI format and identifies a gap between the start of a first Off-state in the first OOP and the end of a first On-state of the first OOP. To determine the multiple OOPS, the method includes receiving via RRC signaling, a table with a number of rows, R, of OOPS, where a row of the number of rows, R, corresponds to the multiple OOPS, and where the DCI format includes a row index corresponding to the row. In some examples, the DCI format includes an OOP field indicating the row index corresponding to the row. The NCR can determine a bit width, B, of an OOP field of the row, where $B=\log_2 R$.

Some embodiments include a non-transitory computer-readable medium storing instructions that, when executed by a processor of an NCR, causes the NCR to perform operations that can include receiving a DCI format including one or more duration fields in a single PDCCH monitoring periodicity, $K_S$, where $K_S$ includes an integer of slots. The operations include determining one or more OOPS within $K_S$ based at least on the DCI format, and communicating with a base station or a UE based at least on the determining. In some embodiments, the DCI format includes a bitmap field, where bits of the bitmap field map to K OFDM symbols from a starting symbol of the PDCCH monitoring periodicity, $K_S$, where a bit value of '1' indicates an On-state of the NCR. The operations can further include receiving via RRC signaling, a set of K consecutive OFDM symbols that are grouped to correspond with a bit in the bitmap field. When the NCR operates in a FDD system, the DCI format can include a 2-bit field that indicates whether the OOP is applied in an uplink (UL) direction, a downlink (DL) direction, or both UL and DL directions.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments include a system, apparatus, article of manufacture, method, and/or computer program product and/or combinations and sub-combinations thereof, for explicit power saving operations for a network-controlled repeater (NCR) in a wireless network. Cellular network deployments provide wireless access coverage, and different types of network nodes are employed to enable wide area service coverage. Having full-stack cells is desirable, but that may not be always possible (e.g., backhauls may not be available or the solution may not be economically viable.) To improve the performance of an NCR, amplify-and-forward radio frequency (RF) repeater side control information can include On-Off information for efficient interference management and improved energy efficiency. Some embodiments include an explicit indication with On-Off state (e.g., via dynamic or semi-static signaling) or an On-Off pattern (e.g., periodic/semi-static On-Off pattern (OOP) or a new Discontinuous Reception (DRX)-like On-Off pattern.)

Figure 1:
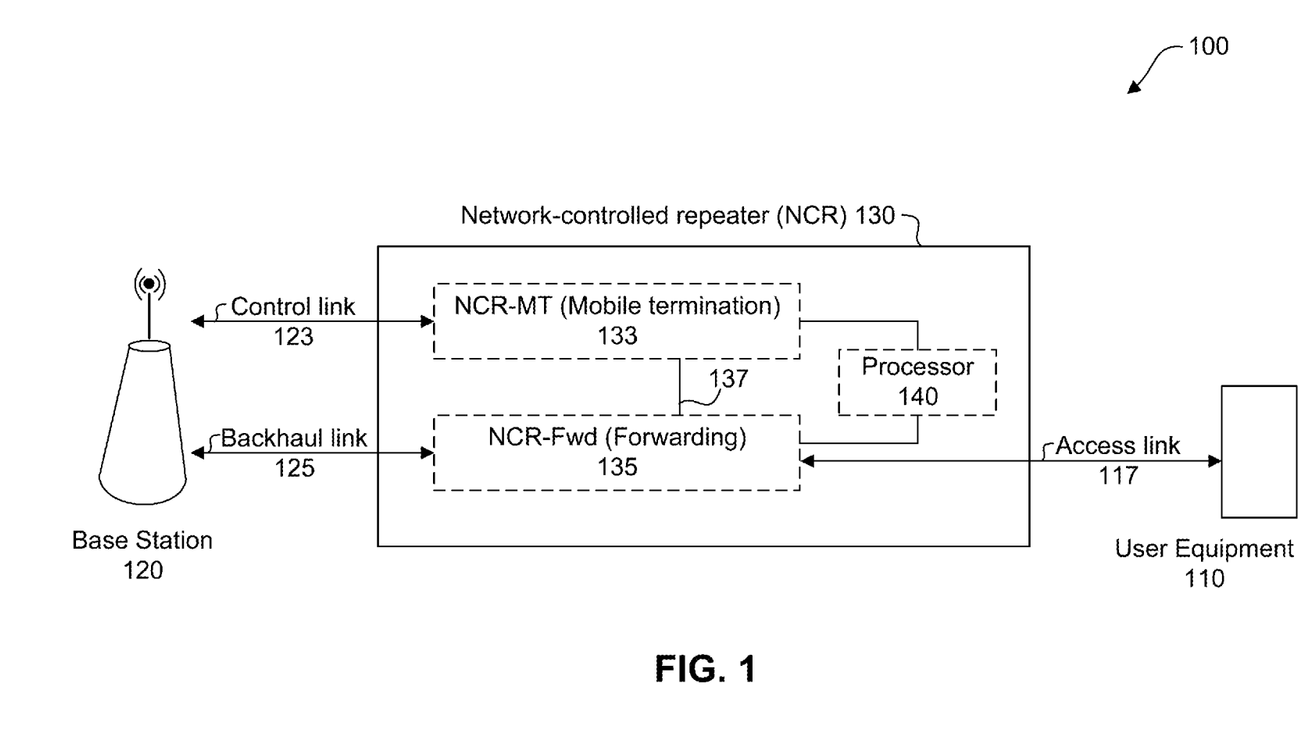
FIG. 1 illustrates an example system for explicit power saving operations for a network-controlled repeater (NCR), in accordance with some embodiments of the disclosure.

FIG. 1 illustrates an example system for explicit power saving operations for a network-controlled repeater (NCR), in accordance with some embodiments of the disclosure. System 100 includes user equipment (UE) 110, base station (BS) 120, and network-controlled repeater (NCR) 130. NCR 130 can include an NCR-mobile termination (NCR-MT) 133 and NCR-forwarding (NCR-Fwd) 135. UE 110 may be a computing electronic device such as a smart phone, cellular phone, and for simplicity purposes—may include other computing devices including but not limited to laptops, desktops, tablets, personal assistants, routers, monitors, televisions, printers, and appliances. BS 120 can include but is not limited to a wireless base station, an enhanced node BS (eNB), a fifth generation new radio BS (gNB), or a transmission and reception point (TRP) of a wireless network. NCR 130 exchanges information with BS 120 via control link 123 and/or backhaul link 125.

NCR-MT 133 can be a functional entity that communicates with BS 120 via a Control link (C-link) 123 to enable the information exchanges (e.g. side control information). C-link 123 can be based on a new radio Uu interface. The side control information (SCI) can include instructions for controlling NCR-Fwd 135. In some examples, the SCI can be included in a Downlink Control Information (DCI) signal. NCR-Fwd 135 can be a functional entity that performs the amplify-and-forwarding of uplink (UL) and/or downlink (DL) RF signals between BS 120 via backhaul link 125, and between UE 110 via access link 117. The behavior of NCR-Fwd 135 can be controlled according to the received SCI from BS 120 over C-link 123. In some embodiments, the SCI can include On-Off information received by NCR-MT 133 that NCR 130 uses to control NCR-Fwd 135 via link 137, for efficient interference management with neighboring cells and reduced power consumption that results in improved energy efficiency. In some embodiments, NCR-MT 133 and NCR-Fwd 135 can be communicatively coupled to processor 140.

Figure 2:
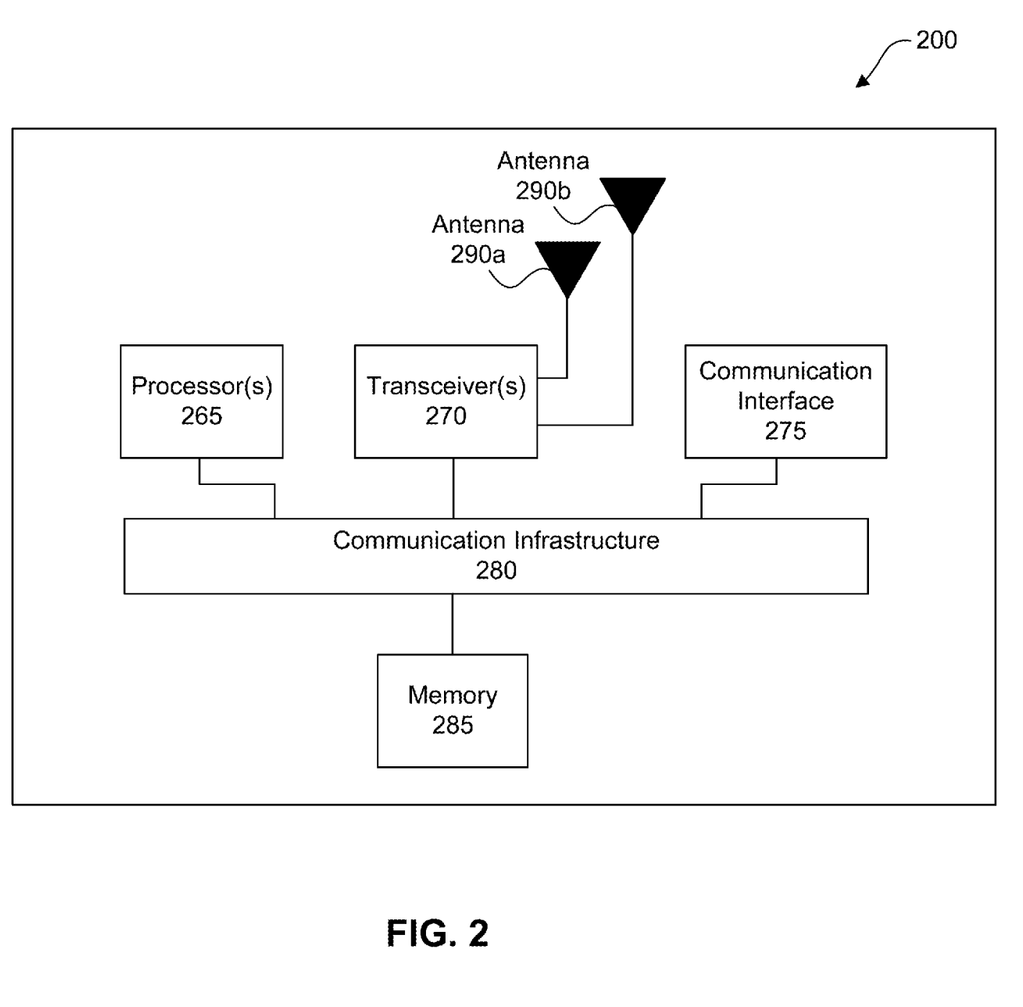
FIG. 2 illustrates a block diagram of an example wireless system for explicit power saving operations for an NCR, according to some embodiments of the disclosure.

FIG. 2 illustrates block diagram of an example wireless system 200 for explicit power saving operations for an NCR, according to some embodiments of the disclosure. For explanation purposes and not a limitation, FIG. 2 may be described with reference to elements from FIG. 1. For example, system 200 may be any of the electronic devices: UE 110, BS 120, or NCR 130 of system 100. In some examples, processors 265 may correspond to processor 140 of system 100. System 200 includes one or more processors 265, transceiver(s) 270, communication interface 275, communication infrastructure 280, memory 285, and antenna 290. Memory 285 may include random access memory (RAM) and/or cache, and may include control logic (e.g., computer instructions) and/or data. One or more processors 265 can execute the instructions stored in memory 285 to perform operations enabling wireless system 200 to transmit and receive wireless communications supporting explicit power saving operations for an NCR described herein. In some embodiments, one or more processors 265 can be "hard coded" to perform the functions herein. Transceiver(s) 270 transmits and receives wireless communications signals including wireless communications supporting explicit power saving operations for an NCR according to some embodiments, and may be coupled to one or more antennas 290 (e.g., 290a, 290b). In some embodiments, a transceiver 270a (not shown) may be coupled to antenna 290a and different transceiver 270b (not shown) can be coupled to antenna 290b. Communication interface 275 allows system 200 to communicate with other devices that may be wired and/or wireless. Communication infrastructure 280 may be a bus. Antenna 290 may include one or more antennas that may be the same or different types.

Figure 3A:
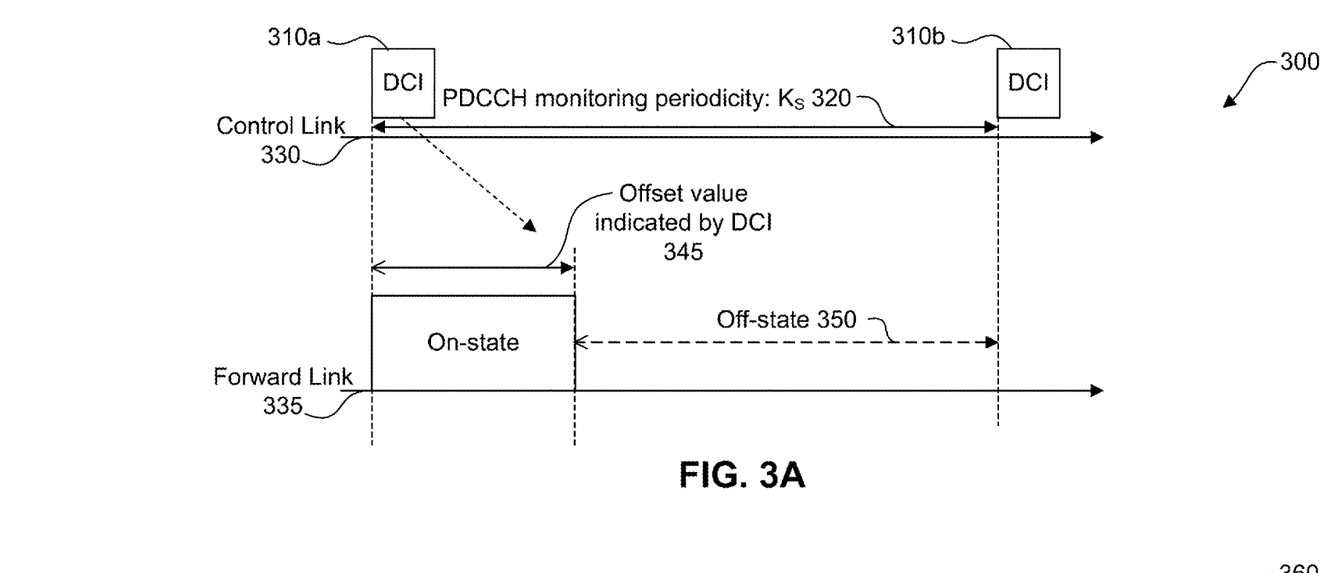
FIG. 3A illustrates an example of a single On-Off Pattern (OOP) within a Physical Downlink Control Channel (PDCCH) monitoring periodicity, according to some embodiments of the disclosure.

FIG. 3A illustrates example 300 of a single On-Off Pattern (OOP) within a Physical Downlink Control Channel (PDCCH) monitoring periodicity, $K_S$ 320, according to some embodiments of the disclosure. For explanation purposes and not a limitation, FIG. 3A may be described with reference to elements from other figures within the disclosure. For example, portions of example 300 can be generated by BS 120, and processed by NCR 130 that includes NCR-MT 133 and NCR-Fwd 135 of FIG. 1, or system 200 of FIG. 2. Some embodiments include providing explicit power On-Off information such that unnecessary interference can be mitigated and the energy efficiency at NCR 130 is improved. Example 300 supports a single OOP within PDCCH monitoring periodicity, $K_S$ 320. In example 300, the On-Off information for NCR 130 can be provided by BS 120 via a DCI signal 310 via control link 330 in a corresponding PDCCH monitoring periodicity denoted as $K_S$ 320 in slots. A default On-Off state in $K_S$ slots can be in either an Off-state or an On-state. In some examples, the default state can be hard-encoded as described in standards, or configured by BS 120 to minimize the signaling overhead. Example 300 can illustrate a default On-state or a default Off-state, but the description of offset value 345 depends on whether the default is the On-state or the Off-state.

In some embodiments, a DCI format of DCI signal 310a, 310b can include an offset value. When the default state is the Off-state, offset value 345 can indicate the duration of the On-State on forwarding link 335. Accordingly, NCR 130 is powered on for the time indicated by Offset value 345, where the On-State starts from the starting symbol of PDCCH monitoring periodicity, $K_S$ 320, and NCR 130 returns to the Off-state according to Off-state 350. When in the On-state, NCR-MT 133 can receive DCI signal 310a, and NCR-Fwd 135 can communicate via forward link 335. Forward link 335 can represent backhaul link 125 and/or access link 117 of FIG. 1. In other words, NCR-Fwd 135 can communicate with BS 120 via backhaul link 125 and/or with UE 110 via access link 117 during the On-state. In the Off-state, NCR 130 can enter a sleep or power save mode to reduce power consumption.

When the default state is the On-state, offset value 345 indicates the gap between the first symbol of PDCCH monitoring periodicity, $K_S$ 320, and the starting symbol of Off-state 350. The Off-state ends at the starting symbol the next PDCCH monitoring occasion that begins with DCI signal 310b.

Figure 3B:
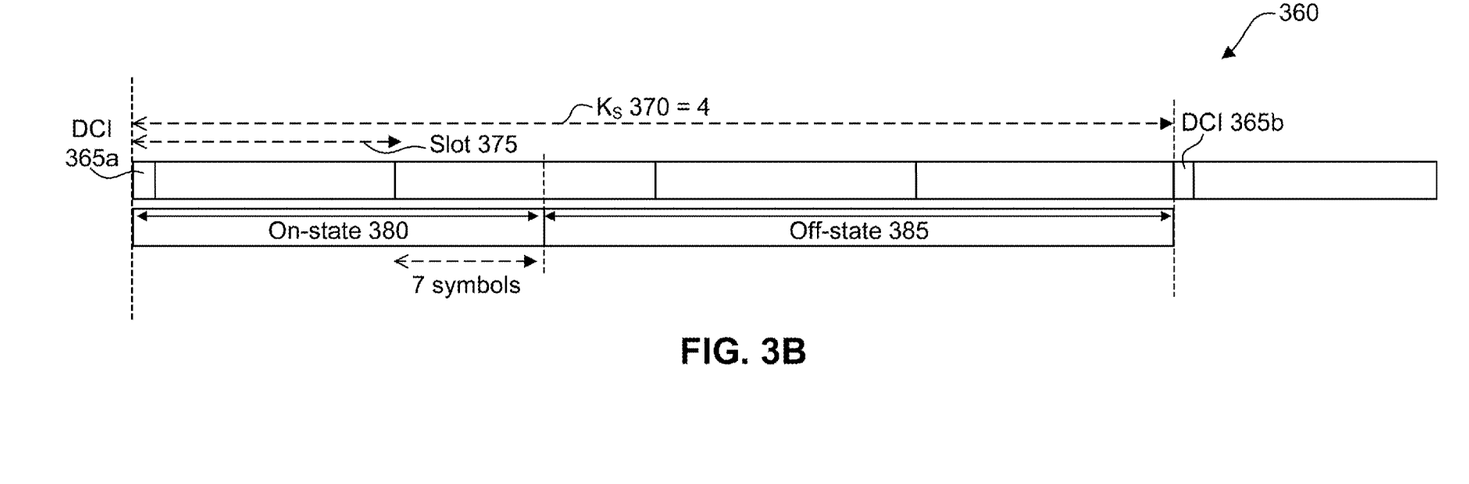
FIG. 3B illustrates an example of a single OOP within a PDCCH monitoring periodicity with symbol-level or slot-level indications, according to some embodiments of the disclosure.

FIG. 3B illustrates example 360 of a single OOP within a PDCCH monitoring periodicity with symbol-level or slot-level indications, according to some embodiments of the disclosure. For explanation purposes and not a limitation, FIG. 3B may be described with reference to elements from other figures within the disclosure. For example, DCI signals 365a, 365b of example 360 can be generated by BS 120, and processed by NCR 130 that includes NCR-MT 133 and NCR-Fwd 135 of FIG. 1, or system 200 of FIG. 2. In some embodiments, the following options maybe considered to indicate offset value 345: i) a range of offset values in orthogonal frequency division multiplexing (OFDM) symbols; ii) a set of candidate offset values in OFDM symbols and/or slots supported by a combination of Radio Resource Control (RRC) and DCI signaling; and iii) two-stage indications. These options with regard to example 360 are shown below in Table 1.

TABLE 1

Types of Offset Value Indications for Single OOP within a PDCCH Monitoring Periodicity

| | Range of Offset Values in OFDM Symbols | Set of Candidate Offset Values in OFDM Symbols and/or Slots | Two-stage Indications |
|---|---|---|---|
| Number of Bits | 6-bits (depending on Ks value) | 3-bits (Depending on offset granularity and Ks value) | 6-bits |
| Field Value in DCI | 010101 | 011 | 00 (first offset) + 0111 (2nd offset) |

Example 360 provides examples for the options above to enable symbol-level or slot-level On-Off indications for NCR 130: $K_S$ 370=4 slots (e.g., 14*4=56 symbols), where slot 375 illustrates a slot length, and DCI signals 365a and 365b occur at the start of the respective PDCCH monitoring periodicities. On-state duration 380 is 1.5 slots (e.g., 21 symbols.) Off-state duration 385 is 2.5 slots (e.g., 56−21=35 symbols.) For the set of candidate offset values in OFDM Symbols and/or Slots that use a combination of RRC and DCI signaling, it is further assumed that the offset granularity is indicated as '7' symbols by RRC signaling to support a half slot granularity.

Range of Offset Values in OFDM Symbols: The value range of the offset starting from 1 to KS*14 in units of OFDM symbols. In example 360, the number of bits depends on KS 370. With 4 slots, value the maximum value of KS 370=56 symbols. Accordingly, 6-bits are needed. As On-state duration 380 is 1.5 slots or 21 symbols, the field value in DCI signal 365 can include '010101'. In some embodiments, the offset indication field includes M bits, where M=ceiling ($\log_2$(KS*14)), and the value of the offset indication field ranges from 1 symbol to KS*14 OFDM symbols.

Set of Candidate Offset Values in OFDM Symbols and/or Slots: In some embodiments, a combination of hard-encoding, RRC signaling and/or DCI signaling are used. For example, a set of candidate values may be hard-encoded or configured by RRC signaling, e.g., <7, 14, 21, 28, etc.> symbols or <1, 2, 4, 8, etc.> slots. Subsequently, one of these candidate values can be dynamically indicated in a DCI format of DCI signal 365a. In another example, a candidate value of the set of candidate values may be first configured by RRC signaling to indicate the offset granularity. Then, DCI signal 365a includes an indication of the offset value based on the RRC-configured (or hard coded) offset granularity. In example 360, it is assumed that the offset granularity is indicated as '7' symbols by RRC signaling to support a half slot granularity. As $K_S$ 370=56 symbols and offset granularity is indicated as 7 symbols, the number of bits needed is 3-bits (56 symbols/7 symbols=8.) As On-state duration 380 is 1.5 slots or 21 symbols, the field value in DCI signal 365 can include '011 (21 symbols/7 symbols=3.)

Two-stage Indications: In some embodiments, the offset indication field, Q, in the DCI format can include Q=($Q_1$+$Q_2$) bits. The first subset, $Q_1$, can be $Q_1$=ceiling ($\log_2$($N_{slot,max}$)) bits that indicates a number of slots $N_{slot}$ relative to a starting slot of $K_S$ in a granularity of one slot with value range from 1 to $N_{slot,max}$, and a second subset, $Q_2$, can be $Q_2$=ceiling ($\log_2$($N_{symbol,max}$)) bits that indicates a number of OFDM symbols $N_{symbol}$, in a slot index $N_{slot}$+1 and the value range for $N_{symbol}$ from 1 to $N_{symbol, max}$, where the starting slot of $K_S$ is indexed at $N_{slot}$=0. The offset indication field includes the first and the second sub sets.

In example 360, the maximum $N_{slot}$ relative to the starting slot of $K_S$ 370 assuming the first slot is indexed with slot #0, is 3, thus the first subset, $Q_1$, needs 2 bits. The maximum number of symbols in a slot is 14 so second subset, $Q_2$, needs 4 bits. As On-state duration 380 begins as DCI signal 365a begins, the first offset value is zero, so Offset 1='00'. The number of symbols, $N_{symbol}$, (e.g., 7 symbols) in the slot index '$N_{slot}$+1' (e.g., slot 1) assuming the first slot is indexed with slot #0. Thus, Offset 2= '0111'.

In some embodiments, NCR 130 operates in a FDD system (e.g., operating in frequency range 1 (FR1)). Accordingly, a separate field such as a 2-bit field (not shown) may be included in the DCI format to indicate which direction the On-Off operation is to be applied, e.g., DL only, UL only or both DL and UL directions.

Figure 4A:
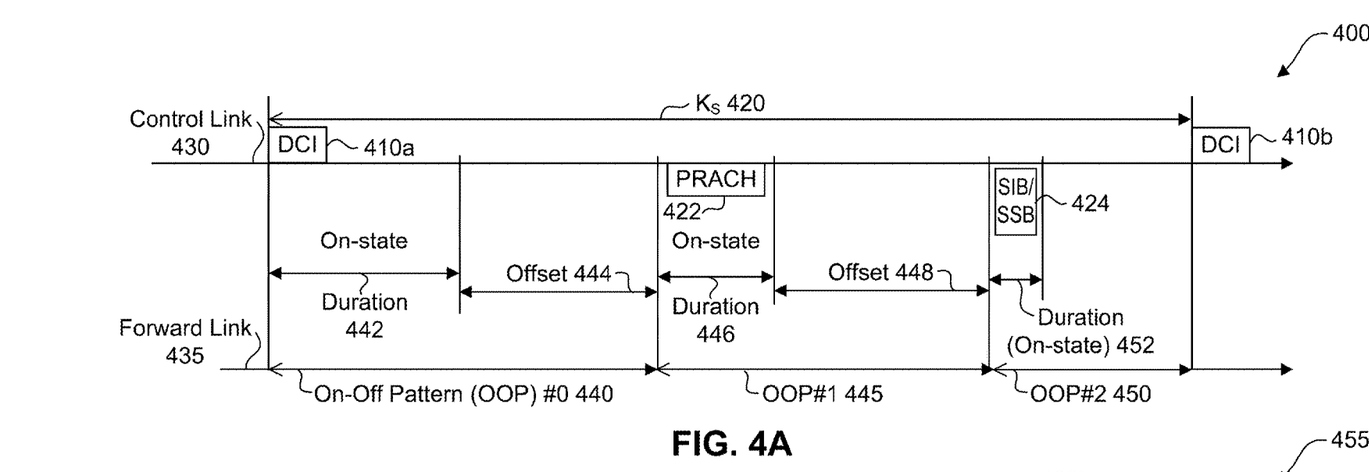
FIG. 4A illustrates an example of multiple OOPS within a PDCCH monitoring periodicity, according to some embodiments of the disclosure.

FIG. 4A illustrates example 400 of multiple OOPS within a PDCCH monitoring periodicity, according to some embodiments of the disclosure. For explanation purposes and not a limitation, FIG. 4A may be described with reference to elements from other figures within the disclosure. For example, portions of example 400 can be generated by BS 120, and processed by NCR 130 that includes NCR-MT 133 and NCR-Fwd 135 of FIG. 1, or system 200 of FIG. 2. In some embodiments, multiple OOPS can be indicated within a PDCCH monitoring periodicity. Example 400 includes multiple OOPS within PDCCH monitoring periodicity, $K_S$ 420. DCI signal 410a, 410b can be transmitted by BS 120 to NCR 130 (e.g., NCR-MT 133) via control link 430. DCI signal 410a can include indications for multiple OOPS (OOP#0 440, OOP#1 445, and OOP#2 450) with corresponding On-states during which NCR 130 (e.g., NCR-Fwd 135) can communicate with BS 120 and/or UE 110 via forward link 435. If the default state is Off-state, an OOP of multiple OOPS can include a duration indication for On-state. If, however, the default state is On-state, then the duration indication is a duration for the Off-state.

Example 400 assumes the default state is Off-state with 3 OOPS within period $K_S$ 420 such that the Physical Random Access Channel (PRACH) 422 and Synchronization Signal Block (SSB)/System Information Block (SIB) information 424 can be forwarded by NCR-Fwd 135 via forward link 435. Durations 442, 446, and 452 indicate durations for On-state for NCR 130. When symbol granularity is used for an offset, the offset value (e.g., Offset 444) for OOP 'i–1' (e.g., OOP#0 440) indicates the gap between the ending symbol of On-state (e.g., duration 442) in OOP 'i–1' (e.g., OOP#0 440) and the starting symbol of ON-state (duration 446) of OOP 'i' (e.g., OOP#1 445), where i≥1. When slot granularity is used for an offset, the offset value (e.g., Offset 444) for OOP 'i–1' (e.g., OOP#0 440) indicates the gap between the ending slot of On-state (e.g., duration 442) in OOP 'i–1' (e.g., OOP#0 440) and the starting slot of On-state (duration 446) of OOP 'i' (e.g., OOP#1 445), where i≥1.

In some embodiments, when the default is the On-state, the offset value for OOP 'i–1' (e.g., OOP#0 440) indicates the gap between the first symbol of Off-state in pattern 'i–1' (e.g., OOP#0 440) and the ending symbol of On-state in OOP 'i–1' (e.g., OOP#0 440).

Figure 4B:
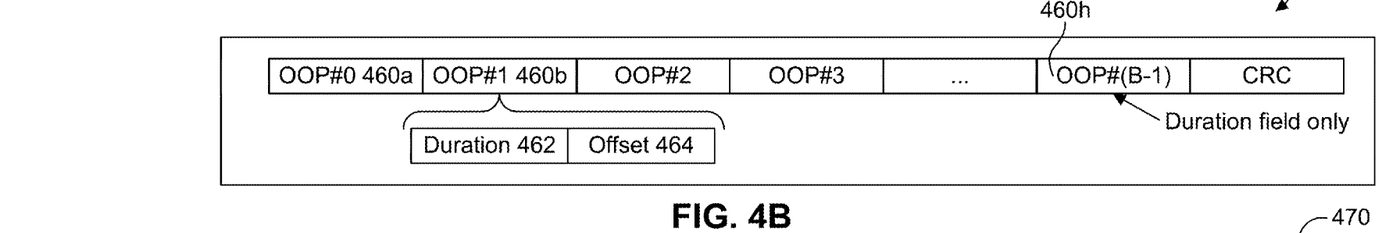
FIG. 4B illustrates an example DCI format indicating multiple OOPS within a PDCCH monitoring periodicity, according to some embodiments of the disclosure.

FIG. 4B illustrates example DCI format 455 indicating multiple OOPS within a PDCCH monitoring periodicity, according to some embodiments of the disclosure. For explanation purposes and not a limitation, FIG. 4B may be described with reference to elements from other figures within the disclosure. For example, DCI format 455 may be transmitted in DCI signal 410a or DCI signal 410b of FIG. 4A. Thus, OOP#0 440, OOP#1 445, and OOP#2 450 of FIG. 4A may correspond to OOP#0 460a, OOP#460b, and OOP# (B-1) 460h of FIG. 4B, where B=3. For the OOP#0 460a and OOP#1 460b, two OOP fields, duration sub-field and offset sub-field are used to indicate duration and offset control information. For the last OOP, OOP #(B-1), only duration sub-field is needed. For example, duration 462 and offset 464 of FIG. 4B may correspond to duration 446 and offset 448 of FIG. 4A. Note that the last OOP (e.g., OOP#(B-1) 460h) may correspond to OOP#2 450 that only includes duration sub-field 452. In other words, there is no need to indicate an offset (e.g., a duration' of Off-state) for the last OOP (e.g., OOP#2 450), which is implicitly determined based on the starting symbol of a next PDCCH monitoring occasion (MO) that begins with the next DCI signal (e.g., DCI signal 410b of FIG. 4A.)

Figure 4C:
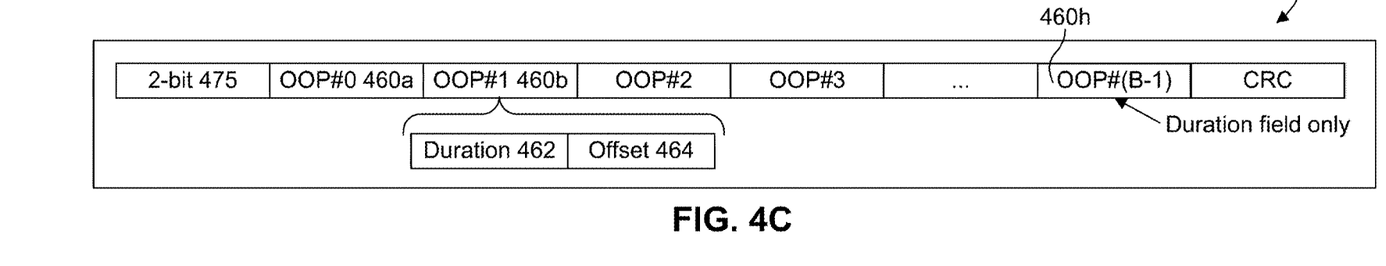
FIG. 4C illustrates an example DCI format indicating multiple OOPS within a DCI periodicity in a frequency division duplex (FDD) system, according to some embodiments of the disclosure.

FIG. 4C illustrates example DCI format 470 indicating multiple OOPS within a PDCCH monitoring periodicity in a frequency division duplex (FDD) system, according to some embodiments of the disclosure. For explanation purposes and not a limitation, FIG. 4C may be described with reference to elements from other figures within the disclosure. For example, FIG. 4C may be similar to FIG. 4B with the addition of 2-bit field 475. In some embodiments, NCR 130 operates in a FDD system (e.g., operating in frequency range 1 (FR1)). Accordingly, a separate field like 2-bit field 475 may be included in the DCI format to inform NCR 130 as to which direction the indicated On-Off operation is applied, e.g., DL only, UL only or both DL and UL directions.

Figure 5A:
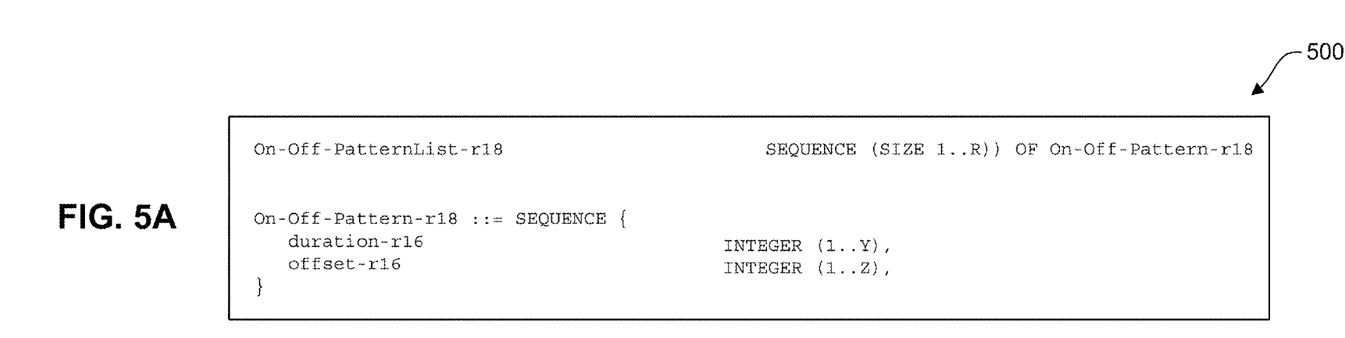
FIG. 5A illustrates an example of a Radio Resource Control (RRC) configuration message for multiple OOPS within a PDCCH monitoring periodicity, according to some embodiments of the disclosure.

FIG. 5A illustrates example 500 of an RRC configuration message for multiple OOPS within a PDCCH monitoring periodicity, according to some embodiments of the disclosure. For explanation purposes and not a limitation, FIG. 5A may be described with reference to elements from other figures within the disclosure. For example, portions of example 500 can be generated by BS 120, and processed by NCR 130 that includes NCR-MT 133 and NCR-Fwd 135 of FIG. 1, or system 200 of FIG. 2. For example, a combination of hard-encoding, or RRC signaling and/or DCI signaling generated by BS 120 can be used to configure NCR 130 with multiple OOPS within a PDCCH monitoring periodicity.

Example 500 illustrates an RRC configuration message that may be transmitted by BS 120 to NCR 130 to configure a table of multiple OOPS indexed by row.

Figure 5B:
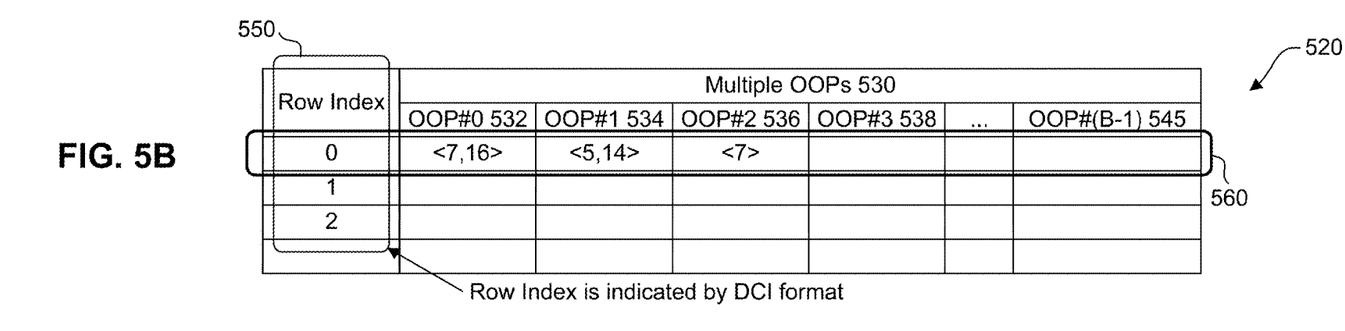
FIG. 5B illustrates an example table including a row index for multiple OOPS within a PDCCH monitoring periodicity, according to some embodiments of the disclosure.

FIG. 5B illustrates example table 520 including a row index for multiple OOPS within a PDCCH monitoring periodicity, according to some embodiments of the disclosure. For explanation purposes and not a limitation, FIG. 5B may be described with reference to elements from other figures within the disclosure. For example, the RRC configuration message of FIG. 5A may be received and used by NCR 130 to populate example table 520 of FIG. 5B. Subsequently, NCR 130 may receive a DCI signal from BS 120 that includes a row index (e.g., row index 0) that corresponds to row 560 with multiple OOPS in a PDCCH monitoring periodicity, $K_S$. Example table 520 illustrates an example of an RRC-configurable table, that allows a wireless network (e.g., via BS 120) to concatenate one or multiple OOPS to be associate with each row index or row index column 550. Each OOP has full flexibility to indicate a duration and offset value based on the intended time-domain location for On-state. The last OOP, however, only needs to indicate a duration for On-state.

In some embodiments, multiple OOPS may be provided by means of DCI or physical downlink shared channel (PDSCH), which indicates a row index that points to a concatenation of one or more OOPS. Each OOP in a row of table can be configured by RRC signaling as shown in example 500. The number of rows 'R' for example table 520 can be configured by RRC signaling explicitly. Correspondingly, the bit width 'B' of an OOP field in a DCI signal is determined as follows: B=[$\log_2$ R].

Example table 520 can include row indexes where a row index corresponds to one or more of multiple OOPS 530 shown as OOP#0 532, OOP#1 534, OOP#2 536, OOP#3 538, and so on to OOP#(B-1) 545. As an example, row 560 with row index 0 can be configured by RRC signaling with 3 OOPS: OOP#0 532 includes a duration sub-field and offset sub-field with values <7, 16>, OOP#1 534 includes a duration sub-field and offset sub-field with values <5, 14>, and OOP#2 536 includes a duration sub-field with value <7>.

Figure 5C:
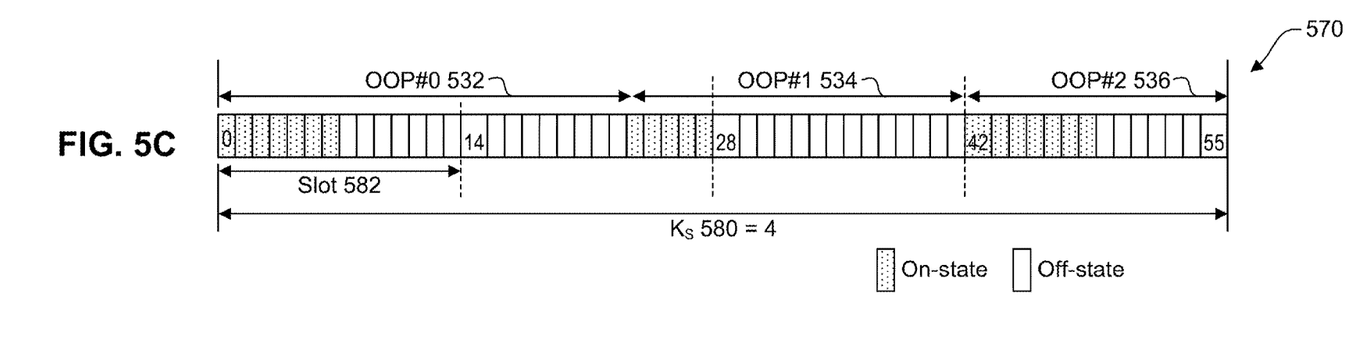
FIG. 5C illustrates an example of multiple OOPS within a PDCCH monitoring periodicity corresponding to a row index, according to some embodiments of the disclosure.

FIG. 5C illustrates example 570 for multiple OOPS within a PDCCH monitoring periodicity corresponding to row index 0, according to some embodiments of the disclosure. For explanation purposes and not a limitation, FIG. 5C may be described with reference to elements from other figures within the disclosure. Example 570 may include multiple OOPS corresponding to row index 0 and row 560 of FIG. 5B where $K_S$ 580=4 slots, and slot 582 illustrates 14 OFDM symbols in a single slot. When NCR 130 receives a DCI signal that includes row index 0, NCR 130 can determine the OOPS based on row 560 of example table 520 that may be stored in memory for NCR 130. Based on example table 520, for example, for OOP#0 532, NCR 130 (e.g., NCR-Fwd 135) enters the On-state for a duration of 7 OFDM symbols followed by 16 OFDM symbols in the Off-state. For OOP#1 534, NCR 130 remains in On-state for a duration of 5 OFDM symbols, and returns to the Off-state for the next 14 OFDM symbols. At OOP#2 536, NCR 130 enters the On-state for a duration of 7 OFDM symbols and enters the Off-state until the end of OOP#2 536.

In some embodiments, NCR 130 operates in a FDD system (e.g., operating in frequency range 1 (FR1)). Accordingly, a separate 2-bit field may be included in a DCI format (not shown) to inform NCR 130 as to which direction the indicated On-Off operation is applied, e.g., DL only, UL only or both DL and UL directions.

Figure 6A:
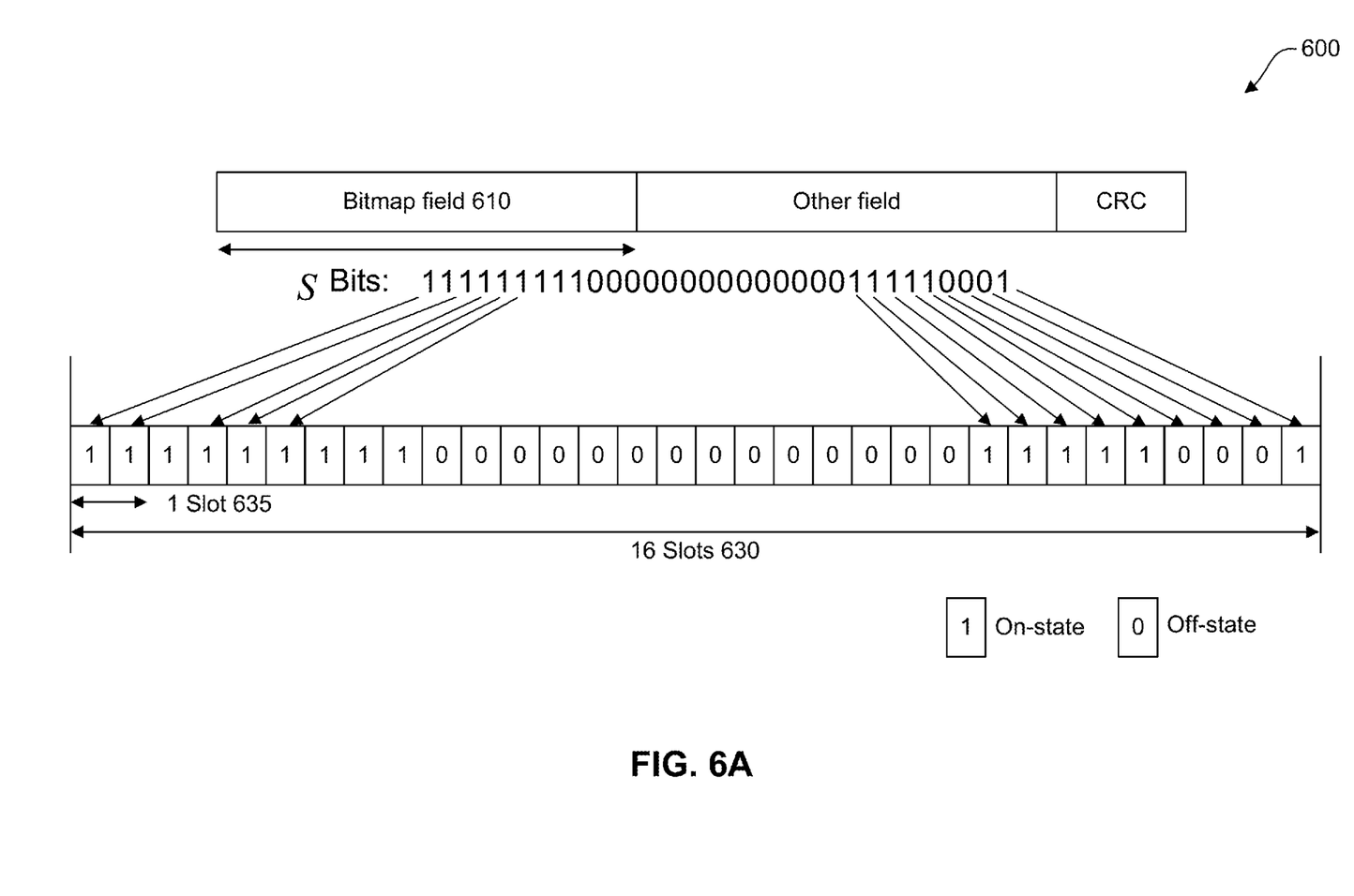
FIG. 6A illustrates an example of a bitmap DCI format for multiple OOPS within a PDCCH monitoring periodicity, according to some embodiments of the disclosure.

FIG. 6A illustrates example 600 of a bitmap DCI format for multiple OOPS within a PDCCH monitoring periodicity, according to some embodiments of the disclosure. For explanation purposes and not a limitation, FIG. 6A may be described with reference to elements from other figures within the disclosure. For example, portions of example 600 can be generated by BS 120, and processed by NCR 130 that includes NCR-MT 133 and NCR-Fwd 135 of FIG. 1, or system 200 of FIG. 2. Example 600 includes bitmap field 610 to indicate one or more OOPS in a DCI format. In some embodiments, each bit from the most significant bit (MSB) of bitmap field 610 has a one-to-one mapping with K consecutive symbols from the starting symbol of a PDCCH slot. The value of K maybe configured by RRC signaling or from a set of hard-encoded set. For example, K may include a set including 7 or 14 OFDM symbols, K∈{7,14}.

Example 600 includes 3 OOPS within a DCI monitoring period or PDCCH monitoring periodicity, $K_S$=16 slots, where K=7, i.e., seven symbols (e.g., a half slot) are grouped to be associated with one bit in bitmap field 610. Consequently, the bit width of bitmap field 610 is shown as 'S' is determined as follows: S=16*14/7=32 bits. As shown, slot 635 illustrates one slot that includes 2 bits. According to the bits in bitmap field 610, there are 3 OOPS in $K_S$, where a bit with a value of 1 corresponds to an On-state, and a bit with a value of 0 corresponds to an Off-state.

Figure 6B:
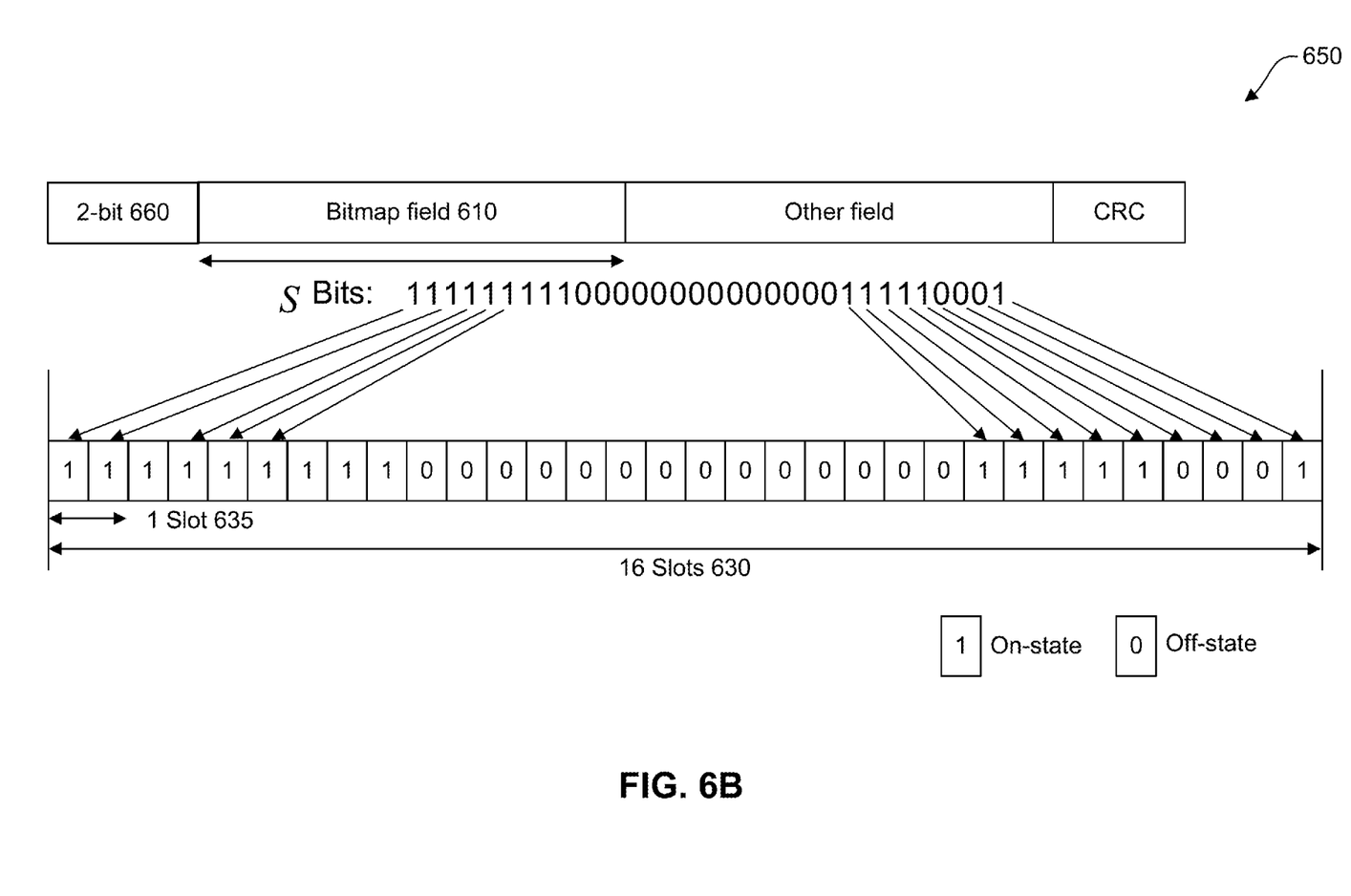
FIG. 6B illustrates an example of a bitmap DCI format for multiple OOPS within a PDCCH monitoring periodicity in an FDD system, according to some embodiments of the disclosure.

FIG. 6B illustrates example 650 of a bitmap DCI format for multiple OOPS within a PDCCH monitoring periodicity in an FDD system, according to some embodiments of the disclosure. For explanation purposes and not a limitation, FIG. 6B may be described with reference to elements from other figures within the disclosure. For example, example 650 is the same as example 600 of FIG. 6A, but with the addition of 2-bit field 660. In some examples, 2-bit field 660 may include more than 2-bits. In some embodiments, NCR 130 operates in a FDD system (e.g., operating in frequency range 1 (FR1)). Accordingly, a separate bit field (e.g., 2-bit 660) may be included in a DCI format that includes bitmap field 610. The values of 2-bit 660 can inform NCR 130 as to which direction the indicated On-Off operations are applied, e.g., DL only, UL only or both DL and UL directions.

Figure 7:
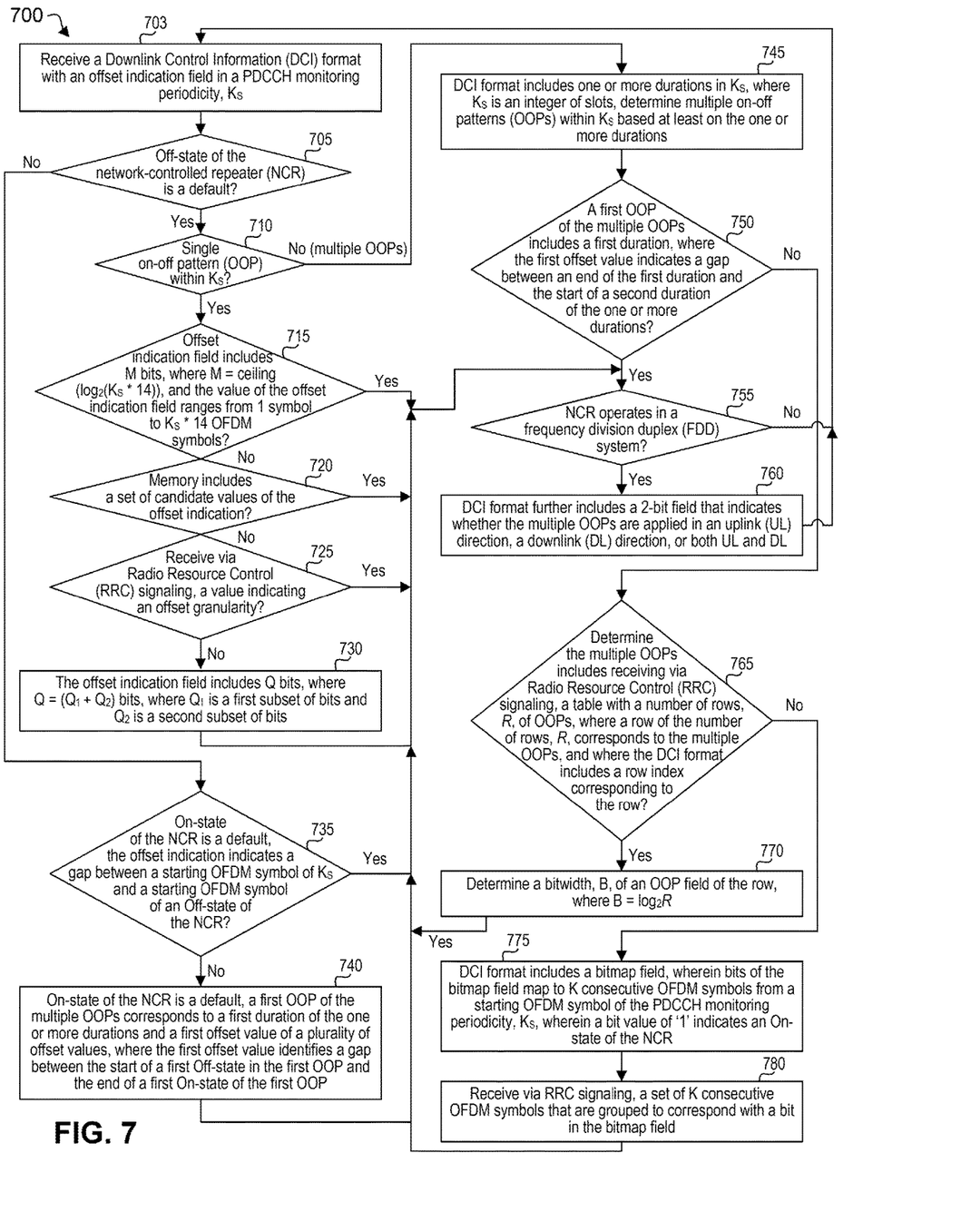
FIG. 7 illustrates an example method for an NCR supporting explicit power saving operations, according to some embodiments of the disclosure.

FIG. 7 illustrates example method 700 for an NCR supporting explicit power saving operations, according to some embodiments of the disclosure. For explanation purposes and not a limitation, FIG. 7 may be described with reference to elements from other figures within the disclosure. For example, portions of example 700 can be performed by NCR 130 that includes NCR-MT 133 and NCR-Fwd 135 of FIG. 1, or system 200 of FIG. 2.

At 703, system 200 receives a DCI format with an offset indication field in a PDCCH monitoring periodicity, $K_S$.

At 705, system 200 determines whether an Off-state of NCR 130 is a default. When the Off-state is the default state, method 700 proceeds to 710. Otherwise, method 700 proceeds to 735.

At 710, system 200 determines whether a single on-off pattern (OOP) occurs within the PDCCH monitoring periodicity, $K_S$. When a single OOP occurs within $K_S$, method 700 proceeds to 715. Otherwise, method 700 proceeds to 745.

At 715, system 200 determines whether the offset indication field comprises M bits, where M=ceiling ($\log_2$ ($K_S$*14)), and the value of the offset indication field ranges from 1 symbol to $K_S$*14 OFDM symbols. When M bits, where M=ceiling ($\log_2(K_S$*14)), and the value of the offset indication field ranges from 1 symbol to $K_S*14$ OFDM symbols, method 700 proceeds to 755. Otherwise, method 700 proceeds to 720.

At 720, system 200 determines whether a memory includes a set of candidate values of the offset indication field including a set of OFDM symbols or a set of slots configured via RRC signaling, and the value of the offset indication field is mapped to a candidate value of the set of candidate values. When the memory includes a set of candidate values of the offset indication and the value of the offset indication field is mapped to a candidate value of the set of candidate values, method 700 proceeds to 755. Otherwise, method 700 proceeds to 725.

At 725, when system 200 determines that a Radio Resource Control (RRC) signal including a value indicating an offset granularity has been received, method 700 proceeds to 755. When system 200 receives via Radio Resource Control (RRC) signaling, an offset granularity, G, where the offset indication field comprises N bits, where N=ceiling ($\log_2(K_S/G)$), and the value of the offset indication field corresponds to units of the offset granularity, G, method 700 proceeds to 755. Otherwise, method 700 proceeds to 730.

At 730, system 200 determines that the offset indication field includes Q bits, where $Q=(Q_1+Q_2)$ bits, where $Q_1$ is a first subset of bits and $Q_2$ is a second subset of bits, and $Q_1$=ceiling ($\log_2(N_{symbol,max})$) bits that indicate a number of slots, $N_{slot}$, relative to a starting slot of $K_S$ with values ranging from 1 to $N_{slot,max}$. Also, $Q_2$=ceiling ($\log_2(N_{symbol,max})$) bits that indicate a number of OFDM symbols, $N_{symbol}$, in a slot index $N_{slot}+1$ with values ranging from 1 to $N_{symbol,\ max}$, where the starting slot of $K_S$ is indexed at $N_{slot}=0$, where the offset indication field, Q, includes the first subset, $Q_1$, and the second subset, $Q_2$. Method 700 proceeds to 755.

At 735, when system 200 determines that On-State of NCR 130 is a default and the offset indication indicates a gap between a starting OFDM symbol of $K_S$ and a starting OFDM symbol of an Off-state of NCR 130, method 700 proceeds to 755. Otherwise, method 700 proceeds to 740.

At 740, system 200 determines that the On-state of NCR 130 is a default, and a first OOP of the multiple OOPS corresponds to a first duration of the one or more durations and a first offset value of a plurality of offset values, where the first offset value identifies a gap between the start of a first Off-State in the first OOP and the end of a first On-State of the first OOP. Method 700 proceeds to 755.

At 745, system 200 determines that the DCI format includes one or more durations in $K_S$, where $K_S$ is an integer of slots, and determines multiple on-off patterns (OOPS) within $K_S$ based at least on the one or more durations. Method 700 proceeds to 750.

At 750, when system 200 determines that a first OOP of the multiple OOPS includes a first duration, where the first offset value indicates a gap between an end of the first duration and the start of a second duration of the one or more durations, method 700 proceeds to 755. Otherwise, method 700 proceeds to 765.

At 755, when system 200 determines that NCR 130 operates in an FDD system and method 700 proceeds to 760. Otherwise, method 700 returns to 703.

At 760, system 200 determines that the DCI format further includes a 2-bit field that indicates whether the multiple OOPS are applied in an uplink (UL) direction, a downlink (DL) direction, or both UL and DL directions. Method 700 returns to 703.

At 765, when system 200 determines that the multiple OOPS are received via RRC signal, system 200 configures a table with a number of rows, R, of OOPS, where a row of the number of rows, R, corresponds to the multiple OOPS, and where the DCI format includes a row index corresponding to the row, method 700 proceeds to 770. Otherwise, method 700 proceeds to 775.

At 770, system 200 determines a bit width, B, of an OOP field of the row, R, where $B=\log_2 R$, and method 700 proceeds to 755.

At 775, system 200 determines that the DCI format includes a bitmap field, where bits of the bitmap field map correspond to K consecutive OFDM symbols from a starting OFDM symbol of the PDCCH monitoring periodicity, $K_S$, where a bit value of '1' indicates an On-State of NCR 130. Method 700 proceeds to 780.

At 780, system 200 can receive via RRC signaling, a set of K consecutive OFDM symbols that are grouped to correspond with a bit in the bitmap field.

Figure 8:
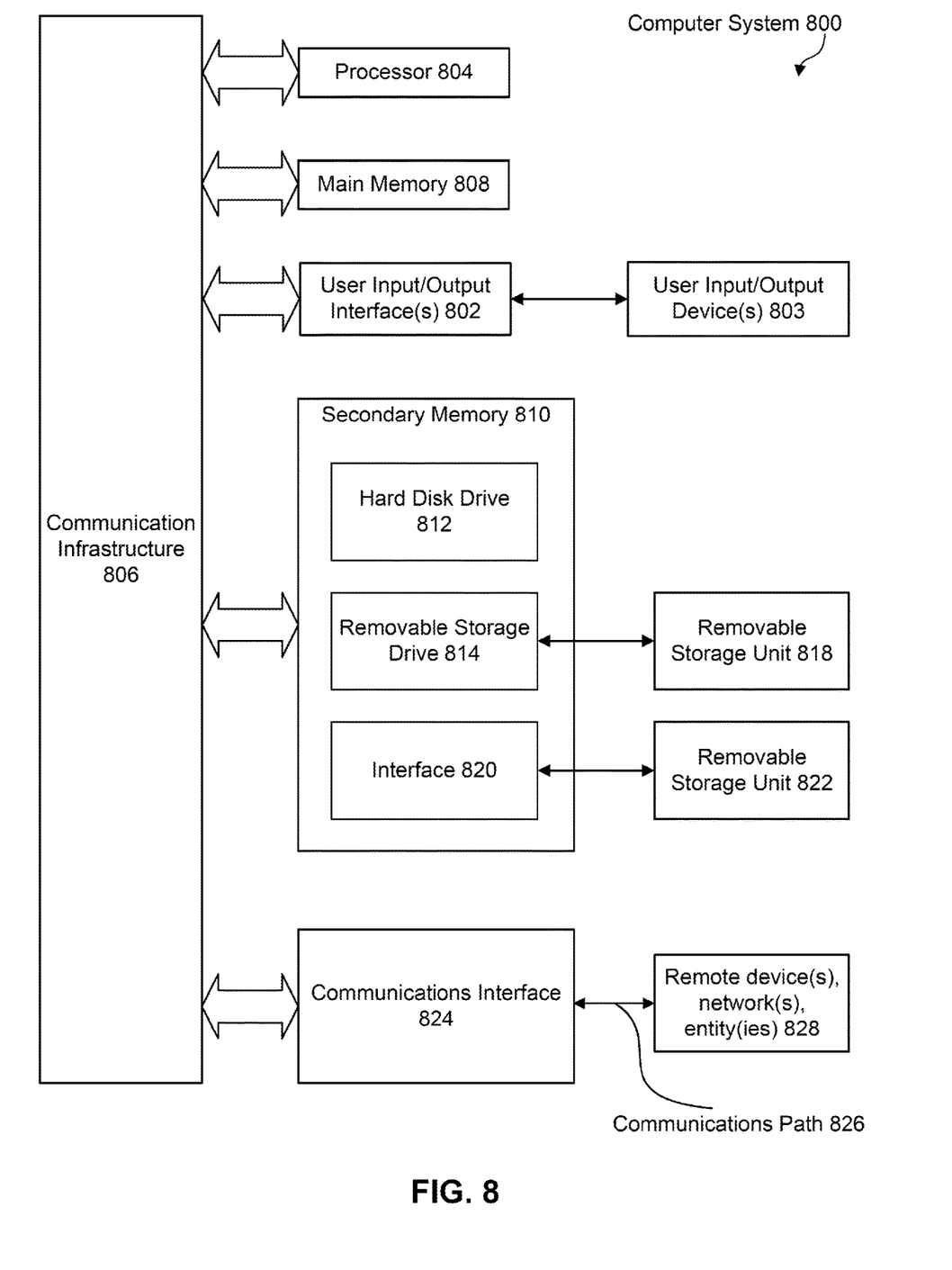
FIG. 8 is an example computer system for implementing some embodiments or portion(s) thereof.

Various embodiments can be implemented, for example, using one or more well-known computer systems, such as computer system 800 shown in FIG. 8. Computer system 800 can be any well-known computer capable of performing the functions described herein. For example, and without limitation, BS 120, NCR 130, and/or UE 110 of FIG. 1, system 200 of FIG. 2, examples of FIGS. 3A and 3B, examples of FIGS. 4A-4C, examples of FIGS. 5A-5C, examples of FIGS. 6A-6B, and method 700 of FIG. 7 (and/or other apparatuses and/or components shown in the figures) may be implemented using computer system 800, or portions thereof.

Computer system 800 includes one or more processors (also called central processing units, or CPUs), such as a processor 804. Processor 804 is connected to a communication infrastructure 806 that can be a bus. One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A network-controlled repeater (NCR) comprising:
a memory; and
a processor coupled to the memory, configured to:
receive a Downlink Control Information (DCI) format comprising an offset indication field in a single Physical Downlink Control Channel (PDCCH) monitoring periodicity, Ks, where Ks includes an integer number of slots;
determine a single On-Off Pattern (OOP) within Ks based at least on a value of the offset indication field, wherein an Off-state of the NCR is a default, the value of the offset indication field identifies a duration of an On-state of the single OOP of the NCR beginning at a starting orthogonal frequency division multiplexing (OFDM) symbol of Ks; and
communicate with a base station or a user equipment (UE) based at lea determination.

2. The NCR of claim 1, wherein the offset indication field comprises M bits, where M=ceiling ($\log_2$(Ks*14)), and the value of the offset indication field ranges from 1 symbol to Ks*14 OFDM symbols.

3. The NCR of claim 1, wherein the memory comprises a set of candidate values of the offset indication field including a set of OFDM symbols or a set of slots configured via Radio Resource Control (RRC) signaling, the value of the offset indication field is mapped to a candidate value of the set of candidate values.

4. The NCR of claim 1, wherein the processor is further configured to receive via Radio Resource Control (RRC) signaling, an offset granularity, G, wherein the offset indication field comprises N bits, where N=ceiling ($\log_2$(Ks/G)), and the value of the offset indication field corresponds to units of the offset granularity, G.

5. The NCR of claim 1, wherein the offset indication field comprises Q bits, where Q=($Q_1$+$Q_2$) bits, where $Q_1$ is a first subset of bits and $Q_2$ is a second subset of bits, $Q_1$=ceiling ($\log_2$($N_{slot,max}$)) bits that indicate a number of slots, $N_{slot}$, relative to a starting slot of Ks with values ranging from 1 to $N_{slot,max}$, $Q_2$=ceiling ($\log_2$($N_{symbol,max}$)) bits that indicate a number of OFDM symbols, $N_{symbol}$, in a slot index $N_{slot}$+1 with values ranging from 1 to $N_{symbol,max}$, where the starting slot of Ks is indexed at $N_{slot}$=0, wherein the offset indication field comprises the first and the second subsets.

6. A method of operating a network-controlled repeater (NCR) comprising:
receiving a Downlink Control Information (DCI) format comprising one or more duration fields in a single Physical Downlink Control Channel (PDCCH) monitoring periodicity, Ks, where Ks includes an integer number of slots;
determining multiple On-Off patterns (OOPs) within Ks based at least on one or more values of the one or more duration fields, wherein an Off-state of the NCR is a default, the one or more duration fields correspond to On-states of the multiple OOPs beginning at a starting orthogonal frequency division multiplexing (OFDM) symbol of Ks; and
communicating with a base station or a user equipment (UE) based at least on the determining.

7. The method of claim 6, wherein a first OOP of the multiple OOPs comprises a first duration field of the one or more duration fields and a first offset value, wherein the first offset value indicated in an offset field in the DCI format represents a gap between an end of the first duration field and a start of a second duration field of the one or more duration fields; and a last OOP of the multiple OOPs comprises a last duration field of the one or more duration fields.

8. The method of claim 7, wherein the NCR operates in a frequency division duplex (FDD) system, the DCI format further comprises a 2-bit field that indicates whether the multiple OOPs are applied in an uplink (UL) direction, a downlink (DL) direction, or both UL and DL directions.

9. The method of claim 6, wherein the determining the multiple OOPs comprises receiving via Radio Resource Control (RRC) signaling, a table with a number of rows, R, wherein a row of the number of rows, R, corresponds to the multiple OOPs, and wherein the DCI format comprises a row index corresponding to the row.

10. The method of claim 9, further comprising determining a bit width, B, of an OOP field in the DCI format that is used to indicate the row index, where B=$\log_2$R.

11. A non-transitory computer-readable medium storing instructions that, when executed by a processor of a network-controlled repeater (NCR), cause the NCR to perform operations, the operations comprising:
receiving a Downlink Control Information (DCI) format comprising one or more duration fields in a single Physical Downlink Control Channel (PDCCH) monitoring periodicity, Ks, where Ks is an integer of slots;
determining one or more On-Off patterns (OOPs) within Ks based at least on the DCI format, wherein an Off-State of the NCR is a default, the DCI format comprises an offset indication field that identifies a duration of an On-state of an OOP of the one or more OOPs, beginning at a starting orthogonal frequency division multiplexing (OFDM) symbol of Ks; and
communicating with a base station or a user equipment (UE) based at leas determining.

12. The non-transitory computer-readable medium of claim 11, wherein the DCI signal comprises a bitmap field, wherein bits of the bitmap field map to K consecutive OFDM symbols from a starting symbol of the PDCCH monitoring periodicity, Ks, wherein a bit value of '1' indicates an On-state of the NCR.

13. The non-transitory computer-readable medium of claim 12, wherein the operations further comprise receiving via Radio Resource Control (RRC) signaling, a set of K consecutive OFDM symbols that are grouped to correspond with a bit in the bitmap field.

14. The non-transitory computer-readable medium of claim 12, wherein the NCR operates in a frequency division duplex (FDD) system, the DCI signal further comprises a 2-bit field that indicates whether the OOP is applied in an uplink (UL) direction, a downlink (DL) direction, or both UL and DL directions.

15. The non-transitory computer-readable medium of claim 11, wherein the DCI format comprises M bits where M=ceiling ($\log_2$(Ks*14)), and wherein a value of the offset indication field ranges from 1 OFDM symbol to Ks*14 OFDM symbols.

* * * * *